March 26, 1957     G. HERZOG ET AL     2,786,661
METHOD FOR FORMING AND SURVEYING A CAVERN IN A SALT FORMATION
Filed March 30, 1953
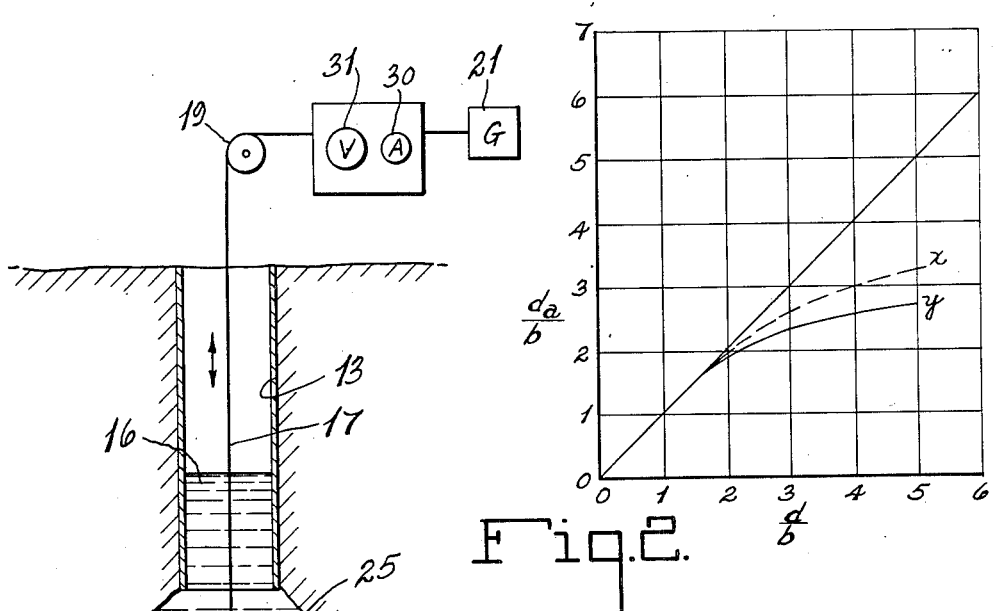
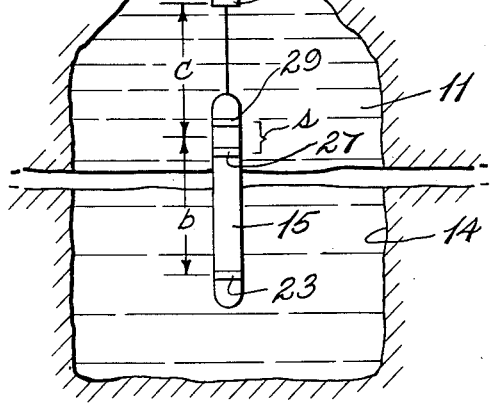
Fig.1.
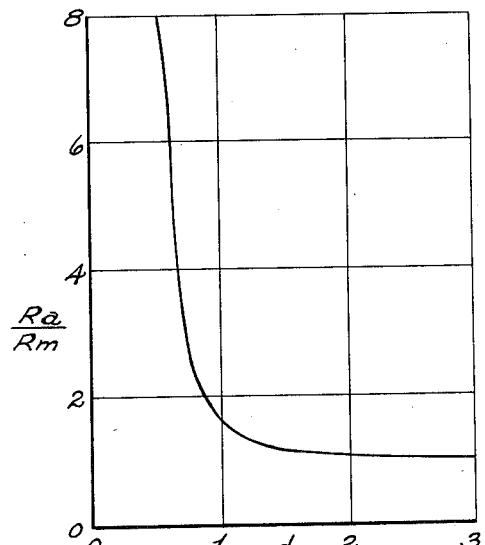
Fig.3.
INVENTORS
GERHARD HERZOG
ROLAND B. STELZER
BY J. H. Grahame
ATTORNEY

United States Patent Office 2,786,661
Patented Mar. 26, 1957

2,786,661

METHOD FOR FORMING AND SURVEYING A CAVERN IN A SALT FORMATION

Gerhard Herzog, Houston, and Roland B. Stelzer, Bellaire, Tex., assignors to The Texas Company, New York, N. Y., a corporation of Delaware Application March 30, 1953, Serial No. 345,414

5 Claims. (Cl. 262—3)

The present invention relates to a novel electrical method for determining the size and shape of a cavity, more particularly a cavity such as a cavern of the type which is formed deep below the surface of the earth for the purpose of storing such petroleum products as the liquefied petroleum gases propane and butane.

Recently petroleum products such as liquefied petroleum gases have been stored within huge caverns formed in natural beds of salt. Caverns of this type having capacities as large as 100,000 barrels have been formed successfully at points as much as 1,000 feet below the surface of the earth. Generally such caverns are formed by drilling a bore from the surface of the earth down into a salt formation such as a salt dome, and then washing out salt by circulating fresh water down one conduit in the bore, such as a central wash pipe, to dissolve salt while continuously removing the brine thus formed through another conduit in the bore, such as the annulus around the wash pipe. Heretofore it has not been possible to determine the actual shape of the growing cavern periodically during its formation as an aid in determining cavern spacing, solving overburden weight problems, and preventing underground cave-ins.

We contemplate first washing out a cavern in a formation of salt or the like in the manner described above, to create a cavity, which in the case of salt or other material that is practically an insulator as far as electrical flow is concerned is characterized by infinitely great resistivity. Then in accordance with the present invention there is provided a novel method for determining electrically the diameter at any selected locality along the length of the cavity, after the wash pipe is removed if it projects into the cavity. The cavity is first provided with a pool of electrically conductive liquid of known resistivity, such as the pool of saturated brine remaining in the cavity when the circulation of water through a salt formation is stopped. An electrode array comprising a pair of vertically spaced voltage electrodes is then positioned in the pool of liquid within the cavity with the midpoint between them at the locality where the diameter is to be measured, and an electrical current of known value is caused to flow in the liquid across the electrodes. The potential difference across the voltage electrodes is then measured and the diameter of the cavity is computed by Ohm's law from the values of resistivity, current, voltage, and electrode spacing then known.

The shape and dimensions of the cavity along its full length can be determined by moving the electrode array in unison either up or down along the vertical axis of the cavity to determine the diameter at successive localities. The electrical characteristics measured can be continuously recorded during movement of the array in the hole.

In the following description the principles of the invention are applied to measurements made in a cavern having walls of salt or other material of infinitely great resistivity, by way of example only. It is to be understood that the principles can also be applied when the walls of the cavity are of a material having some known finite resistivity, suitable mathematical corrections then being employed in accordance with the skill of the art to compensate for the finite resistivity.

The invention will be described more in detail with reference to the drawings, wherein:

Fig. 1 is a schematic vertical sectional view, partly in elevation, showing an arrangement of apparatus for performing the method of the invention in a cavern;

Fig. 2 is a graph showing the relationship among ratios of true diameter $d$, electrode spacing $b+c$, and apparent diameter $da$ of a cavity; and Fig. 3 is a graph showing the relationship among ratios of true diameter $d$, electrode spacing $b+c$, apparent resistivity $Ra$, and true resistivity $Rm$, for the representative case wherein $b=c$.

Referring to Fig. 1, there is shown a large cavern 11 having a vertical access bore 13 extending axially to the surface of the earth and having walls 14 of hard dry salt or other nonconductive material having infinitely great resistivity. The cavern 11 is filled with a pool 16 of a liquid of known resistivity, such as concentrated brine, and has suspended axially therein a probe 15 which hangs from a conductor cable 17 extending to the surface of the earth and passing over a sheave 19 to a suitable source of cyclically changing electricity, such as an alternating current generator 21. An electrical current from generator 21 flows down through cable 17 to a current electrode 23 occupying the lowermost position on the probe 15, and through the pool 16 of brine to a second electrode 25 positioned on the cable 17 a short distance above the top of the probe, thus creating a potential difference across a pair of closely spaced voltage electrodes 27 and 29 on the probe above the current electrode 23. The two pairs of current and voltage electrodes have the electrodes of each pair symmetrically disposed about a common point, which is where the diameter is to be measured. The current and potential difference are measured at the surface of the earth by an ammeter 30 and a potentiometer 31, respectively. Electrodes 23, 25, 27, 29 are insulated from one another, and are connected to the surface by individual insulated wires in the cable 17, or suitable equivalent such as a metal armor enclosing a central conductor using a frequency modulated system, for example.

For determining the diameter of cavity 11 intermediate the two closely spaced voltage electrodes 27 and 29 a current of I amperes is applied across the two current electrodes 23 and 25 to develop a measured potential difference of V volts across the two voltage electrodes 27 and 29. The resistivity R ohm-centimeters of the brine solution in cavity 11 and the distance $s$ centimeters between electrodes 27 and 29 are both known. Therefore, it is possible to compute the diameter in centimeters of the cavity from Ohm's law using the following equation:

$$da = \sqrt{\frac{4IRs}{\pi V}} \quad (1)$$

The relationship between resistivity and salinity of sodium chloride solutions at various temperatures is well known. As typical examples, at 100° F. when the salinities in parts per million are 200,000, 100,000, and 50,000, the resistivities are about .037, .06, and .1 ohm-meters, respectively; and at 150° F. the resistivities for the same salinities are .024, .037, and .07, respectively.

Experiments conducted in a laboratory analogue, using brine-filled long-necked flasks of glass and fiber having infinitely great resistivities to simulate a cavity in a salt formation, have indicated that the accuracy of a direct computation from the above Equation 1 is limited to some extent by the ratio existing between the actual diameter $d$ of the cavity and the distance $(b+c)$ between current electrodes 23 and 25. When $b$ and $c$ are equal and the ratio of $d/(b+c)$ is less than about 1.6 the diameter $da$ calculated by Equation 1 is the true diameter. For example, when distance $(b+c)$ is 36 feet true diameters can be sensed up to about 30 feet without correction. However, when the ratio $d/(b+c)$ is greater than 1.6 an empirical correction chart should be used based on data supplied by the graph shown in Fig. 2 as determined from laboratory experiments with an analogue. In Fig. 2 curve $y$ is based on an electrode spacing wherein the current electrodes 23 and 25 are equally spaced from the midpoint between voltage electrodes 27 and 29, i. e., $b=c$; and curve $x$ is based on a spacing wherein upper current electrode 25 is twice as far from the midpoint as lower current electrode 23 i. e., $c=2b$. Although for illustrative purposes $b$ is used to determine the ratios of $da/b$ and $d/b$, $c$ could have been used as well with appropriate changes in the scales.

Changes in the distance $s$ between the voltage electrodes 27 and 29 do not alter the results obtained. However, the smaller the value of $s$, the greater is the resolving power of the equipment in following abrupt changes in diameter. Preferably $s$ shuold be less than 30% of $b$ to insure a reasonable resolving power.

A second method for interpreting the electrical values as a measure of cavity diameter, which can be used when the distances $b$ and $c$ are equal, involves computing the apparent resistivity $Ra$ of the pool of liquid in cavity 11 from the following equation:

$$Ra = \frac{2\pi V}{I} \times \frac{1}{\frac{1}{r_1} - \frac{1}{r_2}} \quad (2)$$

wherein:

$Ra$ = apparent resistivity in ohm-centimeters
$V$ = potential difference in volts between electrodes 27 and 29
$I$ = current in amperes flowing between electrodes 23 and 25
$r_1 = \frac{1}{2}(b+c) - s$ in centimeters
$r_2 = \frac{1}{2}(b+c) + s$ in centimeters After determining the apparent resistivity $Ra$ the ratio $Ra/Rm$ on the ordinate in Fig. 3 is picked off on the graph to give on the abscissa the ratio $d/(b+c)$ of the true diameter $d$ to spacing $(b+c)$ between current electrodes 23 and 25. Knowing the latter ratio and knowing the distance $(b+c)$ the value of $d$ is readily calculated.

Fig. 3 cannot be used in determining all values of the true diameter. Within a range of $d/b+c$ between 0.6 and 1.5, however, $Ra$ is a function of $d$ and thus leads itself quite well to sensing $d$ by measuring $Ra$. For example, when an electrode spacing $b+c$ of 36 feet is used the apparent resistivity $Ra$ can be interpreted as a measure of true diameter for values of diameter between about 20 and 54 feet; and when $b+c$ is 50 feet, the maximum diameter determinable from $Ra$ is 75 feet.

In the asymmetrical case wherein $b$ and $c$ are unequal, for example wherein $c$ is greater than $b$, a variation of Equation 2 is used, as follows:

$$Ra = \frac{4\pi V}{I} \times \frac{1}{\frac{1}{r_1} - \frac{1}{r_2} + \frac{1}{r'_1} - \frac{1}{r'_2}} \quad (3)$$

wherein:

$Ra$, $V$, and $I$ are as in Equation 2.
$r_1 = b - \frac{1}{2}s$
$r_2 = b + \frac{1}{2}s$
$r'_1 = c - \frac{1}{2}s$
$r'_2 = c + \frac{1}{2}s$ Since the curve of Fig. 3 was prepared for the condition when $b$ and $c$ are equal, Equation 3 should be used in conjunction with other appropriate curves which can be prepared for any selected ratios of $b$ to $c$.

It is evident that a very large range of diameters can be sensed by selectively employing the two procedures described above for interpreting electrical values. For example, when $(b+c)$ is 36 feet the method employing Equation 1 can be used directly for determining diameters up to about 30 feet. For diameters in the range of 20 to 54 feet a combination of Equation 2 and the graph of Fig. 3 can be used effectively.

The diameter at successive points along the axis of the cavity 11 can be determined by moving the probe 15 and electrode 25 either up or down within the cavity by raising or lowering cable 17. Only a single traverse of the cavity is necessary for determining diameters over a wide range since the same electrical measurements are made and recorded for either of the computing procedures described in detail above. Also, when a cavern has widely varying diameters, two sets of electrodes having spacings for both ranges may be traversed through the cavern simultaneously, and two sets of measurements thus made in a single operation.

Not only may the method of the invention be performed with a 4-electrode probe described above, but also with other types of probes capable of providing the necessary measurements. For example, a probe may be used wherein 2 elongated short-circuited focussing electrodes are positioned above and below a short central current electrode, all three electrodes being at about the same potential. The potential difference for a given current flow to a fourth electrode is then measured between the central electrode and a potential electrode spaced above the other three.

The principles of the invention have been described only by way of illustration in connection with determining the size and shape of a brine-filled storage cavern in a natural bed of salt having infinitely great resistivity. It is apparent that the same principles can be used when the cavity contains other electrically conductive liquids, and is located within other materials whether of a natural mineral origin or made by man from such materials as glass or fiber.

Obviously many modifications and variations of the invention as hereinbefore set forth, may be made without departing from the spirit and scope thereof, and therefore only such limitations should be imposed as are indicated in the appended claims.

We claim:

1. In determining the diameter at a selected locality in a cavity in an underground formation of salt having infinite resistivity, said cavity having a relatively large diameter and being approximately symmetrical about a vertical axis, the method comprising the physical steps of providing in said cavity a pool of brine having known resistivity; positioning a pair of vertically spaced electrodes in said brine approximately on said axis at said locality; applying an electrical current of known value to said liquid across said electrodes thereby developing a voltage in said electrodes; and measuring the voltage across said electrodes.

2. In the process for forming a storage cavity in an underground salt formation by drilling an access bore of relatively small diameter from the surface of the earth into said formation, and circulating water through said bore into said formation to dissolve and carry away salt as brine thereby forming a cavity of relatively large diameter approximately symmetrical about the axis of said bore containing an electrically conductive pool of brine having known resistivity, the improvement which comprises the physical steps of: interrupting the circulation of water, retaining said pool of brine in said cavity, positioning a pair of vertically spaced electrodes in said pool approximately on said axis at a locality where the diameter of said cavity is to be determined, applying an electrical current of known value to said pool across said electrodes thereby developing a voltage in said electrodes, and measuring the voltage across said electrodes.

3. A method in accordance with claim 1, also comprising the step of moving said electrodes in unison along the vertical axis of said cavity to determine the diameter thereof at successive localities.

4. A method in accordance with claim 1 wherein said electrical current is applied across said pair of electrodes from a second pair of electrodes immersed in said liquid.

5. A method in accordance with claim 2, also comprising the step of moving said electrodes in unison along the vertical axis of said cavity to determine the diameter thereof at successive localities.

References Cited in the file of this patent

UNITED STATES PATENTS

| | | |
|---|---|---|
| 1,895,643 | Putnam | Jan. 31, 1933 |
| 2,404,622 | Doan | July 23, 1946 |
| 2,586,868 | Scott | Feb. 26, 1952 |